United States Patent
Castellucci, Sr.

(10) Patent No.: US 11,655,604 B2
(45) Date of Patent: May 23, 2023

(54) SYSTEM FOR INCREASING THE HEIGHT OF SEAWALLS

(71) Applicant: Mark Castellucci, Sr., Napa, CA (US)

(72) Inventor: Mark Castellucci, Sr., Napa, CA (US)

(*) Notice: Subject to any disclaimer, the term of this patent is extended or adjusted under 35 U.S.C. 154(b) by 62 days.

(21) Appl. No.: 17/338,057

(22) Filed: Jun. 3, 2021

(65) Prior Publication Data

US 2021/0381185 A1 Dec. 9, 2021

Related U.S. Application Data

(60) Provisional application No. 63/036,844, filed on Jun. 9, 2020.

(51) Int. Cl.
*E02B 3/14* (2006.01)
*C08L 17/00* (2006.01)
*C09J 181/04* (2006.01)
*E02B 3/06* (2006.01)

(52) U.S. Cl.
CPC ........... *E02B 3/14* (2013.01); *C08L 17/00* (2013.01); *C09J 181/04* (2013.01); *E02B 3/06* (2013.01); *Y02A 10/11* (2018.01)

(58) Field of Classification Search
CPC ..... E02B 3/14; E02B 3/10; E02B 7/08; Y02A 10/11; E02D 17/18; E02D 17/205; C08L 17/00; C09J 181/04
See application file for complete search history.

(56) References Cited

U.S. PATENT DOCUMENTS

| | | | | |
|---|---|---|---|---|
| 3,288,418 A * | 11/1966 | Hinrichs | ................ | E04B 2/824 52/632 |
| 3,465,529 A * | 9/1969 | Helle | .................... | E02B 11/005 405/47 |
| 4,696,598 A * | 9/1987 | Tsuji | ....................... | E02B 7/005 405/91 |
| 5,816,742 A * | 10/1998 | Cordewener | ........... | B29C 48/15 405/45 |
| 6,454,491 B1 * | 9/2002 | Wayne | ...................... | E02B 3/06 405/32 |
| 10,767,032 B2 * | 9/2020 | Pasini | ..................... | B32B 3/266 |
| 2008/0089743 A1 * | 4/2008 | Han | ......................... | E02B 3/04 405/16 |
| 2011/0052852 A1 * | 3/2011 | Samanta | ................ | C09J 195/00 428/351 |
| 2013/0129420 A1 * | 5/2013 | Dudding | ................ | B09B 1/008 405/129.95 |
| 2015/0354160 A1 * | 12/2015 | Ragsdale, Jr. | .......... | E02B 3/126 405/116 |
| 2016/0047109 A1 * | 2/2016 | Zielman | ................... | E02B 3/10 405/117 |

(Continued)

*Primary Examiner* — Benjamin F Fiorello
(74) *Attorney, Agent, or Firm* — Concourse Law Group; Katherine B. Sales, Esq.

(57) ABSTRACT

A seawall comprising a base with a top, a plurality of extensions on the top of the base, and an adhesive or sealant securing the extensions to the base. Each extension comprises a plurality of spaced apart rubber poles extending generally in a direction horizontal to the sea floor, and an outer rubber covering surrounding the poles. A method of increasing the height of a seawall comprising the steps of placing a plurality of the extensions on top of the seawall with the poles extending substantially parallel to the sea floor, and securing the extensions to the top of the seawall.

18 Claims, 3 Drawing Sheets

(56) References Cited

U.S. PATENT DOCUMENTS

2016/0073595 A1\* 3/2016 Smith .................. B05B 1/16
                                                  239/145
2016/0319504 A1\* 11/2016 Vickers ............... E02B 3/108
2017/0254037 A1\* 9/2017 Ragsdale, Jr. ........ E02B 3/126
2017/0254041 A1\* 9/2017 Yu ...................... E02D 29/02

\* cited by examiner

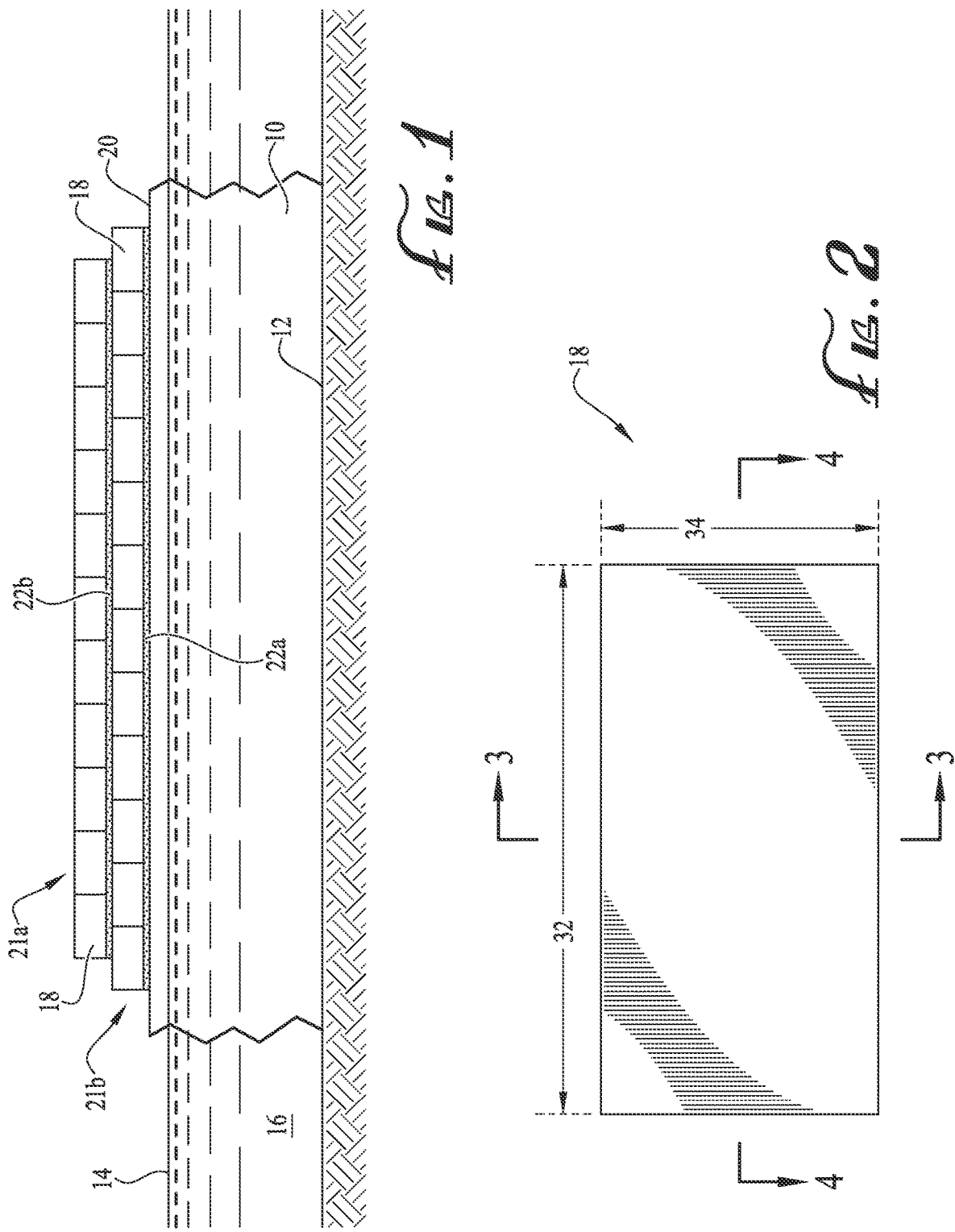

SYSTEM FOR INCREASING THE HEIGHT OF SEAWALLS

CROSS-REFERENCE TO RELATED APPLICATIONS

This application claims priority to U.S. Provisional Patent Application No. 63/036,844, titled "System for Increasing the Height of Seawalls," filed Jun. 9, 2020, the contents of which are incorporated by reference herein in their entirety.

BACKGROUND

Seawalls are used to protect human habitation areas from the action of tides, waves, and tsunamis. They are constructed from various materials, such as reinforced concrete, boulders, steel, or gabions.

A problem with seawalls is they become inadequately tall to provide adequate protection. This can occur due to settling of the seawall, or a rise in ocean levels such as from global warming.

Accordingly, there is a need for a system for inexpensively and easily increasing the height of seawalls.

SUMMARY

The present invention is directed to a method of increasing the height of a seawall by placing a plurality of extensions on top of the seawall and then securing the extensions to the top of the seawall.

As a result of this method, a seawall according to the present invention comprises a base with a top, a plurality of the extensions on top of the base, and an adhesive or sealant securing the extensions to the base. The sealant can be a polysulfide sealant.

Each extension comprises a plurality of spaced apart rubber poles extending generally in a direction horizontal to a sea floor, and an outer rubber covering surrounding the poles.

Preferably the poles are hexagonal in vertical cross section for strength. The extensions can be from about 8 to about 16 inches in height, about 12 to about 36 inches in length, and about 5 to about 15 inches in width.

The extensions can be made by extrusion where the poles and covering are coextruded.

Optionally, there are two layers of extension, an upper layer and a lower layer, and the first layer of extensions are on top of the base and the second layer of extensions is on top of the first layer.

Preferably at least some of the poles are spaced apart from each other by about 0.3 to about 1 inch, and are secured in placed by the covering.

A preferred coating comprises ground up rubber tire with a binder. Optionally, the poles and the covering are made from the same rubber.

The extensions can comprise about 40% to about 70% by weight crumb rubber, about 25% to about 45% by weight high density polyethylene, and about 0% to about 15% by weight carbon black. Preferably, the extensions comprise about 60% by weight crumb rubber, about 35% by weight high density polyethylene, and about 5% by weight carbon black.

DRAWINGS

These and other features, aspects, advantages of the present invention will become better understood with regard to the following description and accompanying drawings wherein;

FIG. 1 is front elevation view of a seawall with a plurality of extensions thereon;

FIG. 2 is a front elevation view of one of the extensions shown in FIG. 1;

DESCRIPTION

Figure 3:
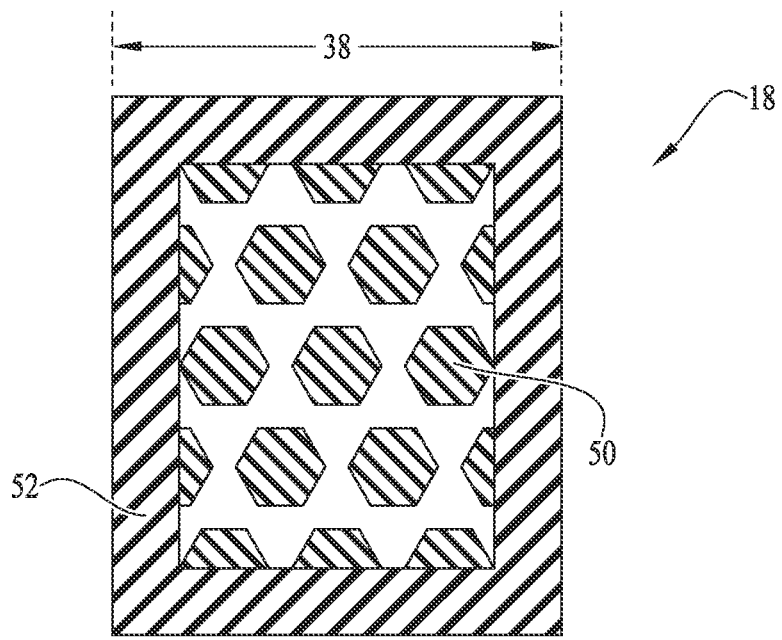
FIG. 3 is a side elevation view of the extension of FIG. 2 taken on line 3-3 in FIG. 2.

With regard to FIG. 1, a seawall 10 sits on the ocean floor 12, the seawall 10 having a height slightly higher than the top 14 of the then existing ocean 16 level. A slight increase in the ocean level or sinking of the seawall 10 can result in waves flowing over the top 20 the seawall 10, with the result that the seawall 10 does not perform its protective function.

According to the present invention, a plurality of extensions 18 are placed on the top 20 of the seawall 10 to increase its height. The extensions 18 can be placed in one or more layers, such as top (upper) layer 21*a* and bottom (lower) layer 21*b* as shown in FIG. 1, with the extensions 18 adjoining side by side, although less preferred there can be spacing between the extensions 18. The layers 21 can be staggered so at least some of the extensions 18 of the upper layer 21*a* are on top of two extensions 18 of the lower layer 21*b*.

The extensions 18 can be secured to the seawall 20 and to each other by mechanical means such as bolts or rivets, or preferably a sealant or adhesive 22*a* between the seawall 10 and the extensions 18. Adhesive or sealant 22*b* is between the top layer 21*a* of extensions 18 and the bottom layer 21*b* of the extensions 18. An adhesive or sealant 22*a* can be used between adjacent extensions 18. A preferred sealant 22*a* is a polysulfide sealant such as Sika Duoflex NS two component sealant available from Sika Corporation located at Lyndhurst, N.J. This sealant 22*a* optionally can be used with a primer. A suitable primer is Sika® Duoflex Primer-5050. This sealant 22*a* provides a tough elastic, rubber-like seal that remains flexible with expansion and contraction, is resilient within a wide temperature range, provides excellent resistance to water, oils, grease, most solvents, mild acids and alkalis, provides tenacious adhesion to concrete, metal, wood, glass, stone, ceramic and masonry surfaces and is effective under constant immersion or saturated conditions.

The extensions 18 need not be identical, but since in a preferred method of manufacturing the extensions 18, they are formed by extrusion of rubber through a die, typically they are of uniform size and shape. For example, the extensions 18 can be brick shaped having a length 32, a height 34, and a width 38.

The length 32 typically is about 12 inches to about 36 inches, and preferably 24 inches. Preferably the height is from about 8 inches to about 16 inches, and preferably about 12 inches. The width is typically to about 5 inches to about 15 inches, and preferably about 10 inches, which matches the width of a typical seawall. Preferably the width 38 of the extensions 18 is slightly smaller than the width of the top 14 of seawall 10 so the extensions 18 can be securely attached to the seawall 10.

Figure 4:
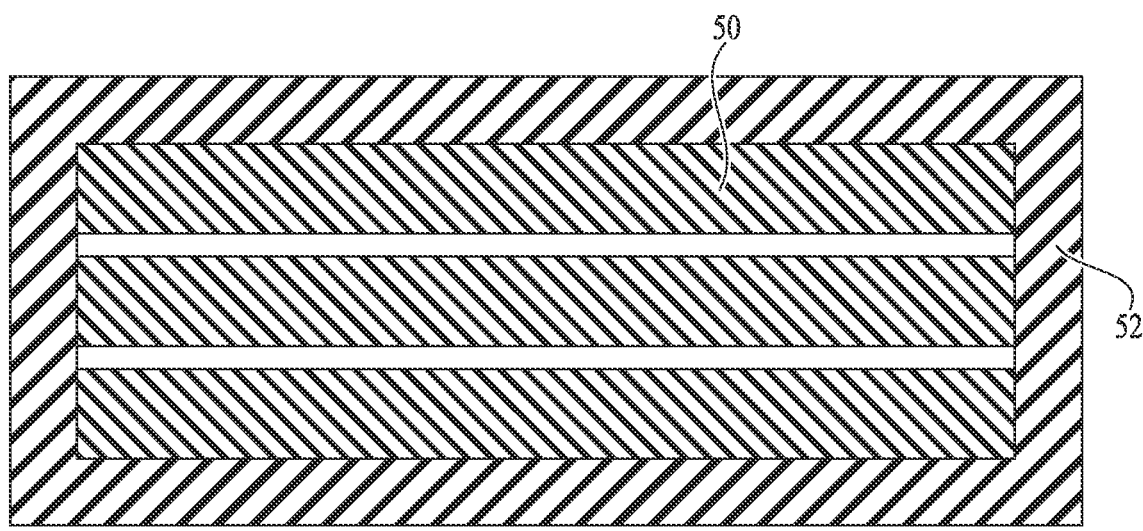
FIG. 4 is a sectional view of the extension of FIG. 2 taken on line 4-4 in FIG. 2.

As best shown in FIGS. 3 and 4, the extensions 18 comprise a plurality of spaced apart rubber poles 50 extending generally in a direction horizontal to the sea floor 12, and an outer rubber coating 52 surrounding the poles 50. Preferably at least some of the poles 50 are hexagonal in horizontal cross section for strength. However, the poles 50 adjacent to the covering 52 are truncated so that they are not hexagonal in shape, as best seen in FIG. 3. The poles 50 are secured in place by the covering 52.

Preferably the poles 50 are spaced apart from about 0.3 inches to about 1 inch, and most preferably about 0.5 inches.

The length of the poles 50 depends on the length 32 of the extensions 18 and the thickness of the coating 52. Thus, when the wall thickness is 2 inches and the length 32 of the extension 18 is 24 inches, the poles 50 are about 20 inches in length. At the extremes, the poles 50 can be from about 6 inches to about 34 inches in length.

Preferably the extensions 18 are a single monocoque element made of rubber, and preferably crumb rubber, which is recycled rubber produced from automobile and truck scraped tires. During the recycling process, steel and tire cord are removed, leaving tire rubber which a granular consistency. A preferred crumb rubber is of 10-20 mesh with a moisture content of about 0.07% by weight. The extensions can be formed from a composition comprising about 40% to about 70% by weight crumb rubber, about 25% to about 45% by weight plastic (high density polyethylene), and about 0% to about 15% by weight carbon black. More preferably, the extensions 18 are formed from a composition comprising 60% by weight 10-20 mesh crumb rubber, 35% by weight plastic, and 5% by weight carbon black.

However, it should be noted that the carbon black is not absolutely necessary, and the extensions 18 can be formed from a composition comprising 60% by weight 10-20 mesh crumb rubber and 40% by weight plastic. If no carbon black is used in the composition, then the crumb rubber utilizes a binder to hold the crumb rubber together. A preferred binder is a polyurethane based binder such as one based on methylene diphenyl diisocyanate ("MDI"). An MDI prepolymer known to be useful for rubber granules is available from Ryvec Inc. of Anaheim, Calif. under the tradename MD-400. It is a polyurethane prepolymer which typically is cured with moisture. Before cure, the coating 52 comprises from about 90 to 95% by weight crumb rubber and about 5 to about 10% by weight binder. Accordingly, the binder is only utilised when carbon black is not added to the composition.

The plastic that is used is high density polyethylene (HDPE) and is heated so that it is in a liquid form when it is introduced to the crumb rubber.

Carbon black is a material produced by the incomplete combustion of heavy petroleum products such as FCC tar, coal tar, or ethylene cracking tar. Carbon black is a form of paracrystalline carbon that has a high surface-area-to-volume ratio, albeit lower than that of activated carbon. Preferably, the carbon black that is used in the present invention is recycled carbon black that is sourced from processing old tires. Carbon black is a beneficial component of the present invention because it provides a structural benefit and increases the strength of the composition functioning much in the same way as a concrete.

The extensions 18, including the poles 50 and the coating 52, can be formed in a single step by extruding the rubber with the binder through a die. Curing is effected by heating the die, typically to 180 degrees Fahrenheit or higher, wherein the combination of the heat and pressure from the die results in the desired configuration. Before cure the rubber contains about 0.2% by weight water. Higher water content results in a harder rubber.

Figure 5:
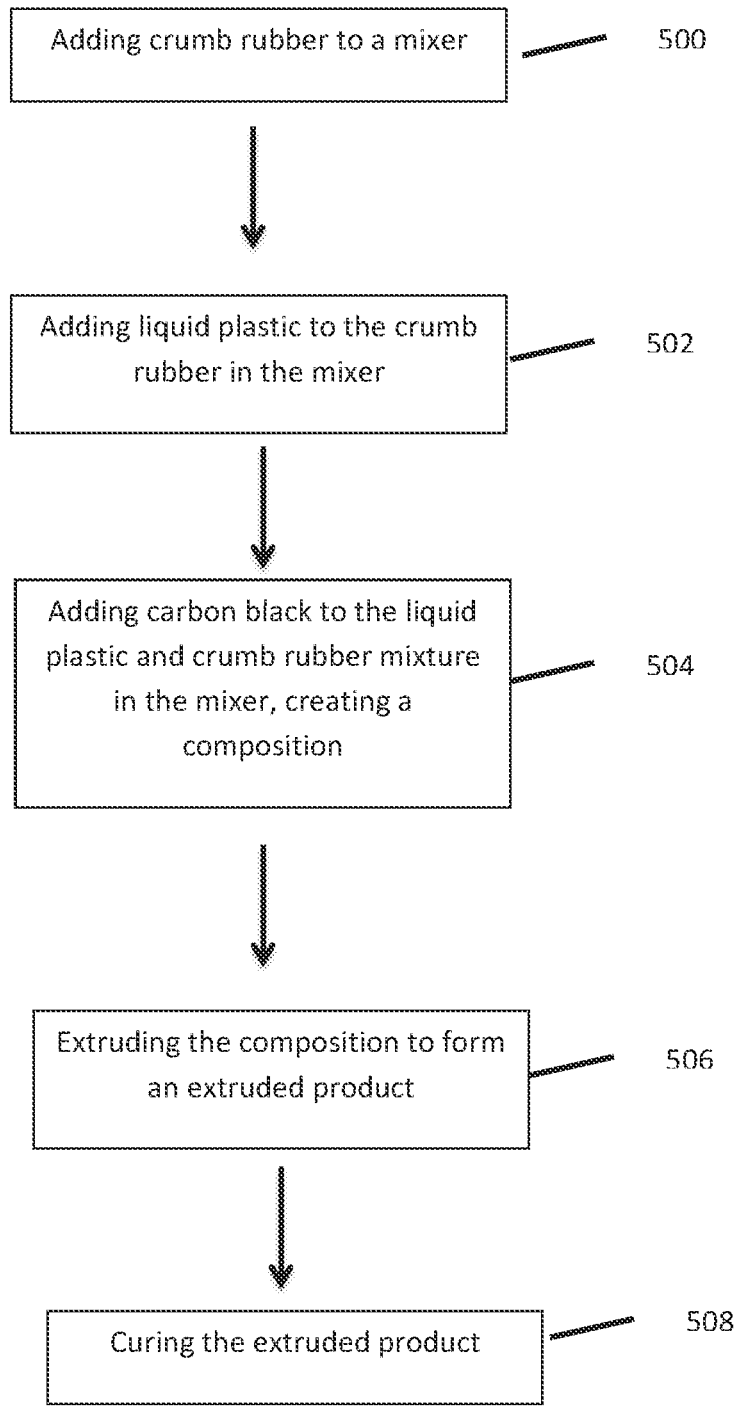
FIG. 5 is a flow chart depicting a method of making a composition used to form the extensions of FIG. 1.

Referring now to FIG. 5, there is shown a method of making the extensions 18 of the present invention. To make the composition that the extensions 18 are made out of, the 10-20 mesh crumb rubber is added to a Banbury mixer 500. The Banbury mixer resembles a robust dough mixer in that two interrupted spiral rotors move in opposite directions at 30 to 40 rotations per minute.

Next, HDPE plastic, which has been heated so that it is in liquid form, is injected into the mixer and allowed to mix with the crumb rubber 502. The mixer is continuously heating the mixture to about 220 degree Fahrenheit so that the mixture maintains an extrudable form and all of the components can adequately mix.

And finally, the carbon black, if desired, is added to the crumb rubber/plastic mixture 504. Typically, the carbon black is in the form of a dry powder.

An extruder is coupled to the mixer so that once all of the components are mixed, the composition is then extruded to form the extension 18.

Due to the configuration of both the mixer and the extruder, both the process of mixing and the process of extruding function together, as one continuous process, with additional amounts of crumb rubber, HDPE and carbon black added as needed.

As noted above, all of the components of the extension 18 can be formed in a single step by extruding the composition through a die. Curing 508 is effected by heating the die, typically 180 degrees Fahrenheit or higher, wherein the combination of the heat and pressure from the die cures the rubber composition. Before curing, the rubber contains about 0.2% by weight water. A higher water content results in a harder rubber.

It is important to note that extensions 18 are formed without vulcanizing the composition that is used to form them. This is significant because it avoids the negative environmental effects associated with vulcanizing, such as the discharge of chemicals into the air and surrounding environment. Thus, the extensions 18 are environmentally friendly as they not only utilize recycled products, but do not involve vulcanizing.

Additionally, the extensions 18 are sustainable in that if they are damaged over their lifetime, the extensions 18 can be recycled to form new extensions 18.

Advantages of the present invention also include that the extensions 18 are light weight, inexpensive, and can be used to retrofit to existing seawalls 10.

Features of the present invention include:

A-1 A seawall comprising:
 a) a base with a top;
 b) a plurality of extensions on the top of the base, each extension comprising:
  i) a plurality of space apart rubber poles extending generally in a direction horizontal to the sea floor; and
  ii) an outer rubber covering surrounding the poles; and
 c) an adhesive or sealant securing the extensions to the base.
 d) Features of the present invention include:

A-2 The seawall of feature A-1 wherein at least some of the poles are hexagonal in horizontal cross section.

A-3 The seawall of feature A-1 wherein at least some of the extensions are about 8 to about 16 inches in height.

A-4 The seawall of feature A-1 or A-3 Wherein at least some of the extensions are about 12 to about 36 inches in length.

A-5 The seawall of feature A-1, A-3, or A-4 wherein at least some of the extensions are about 5 to about 15 inches in width.

A-6 The seawall of feature A-1 wherein the covering is from about 1 to about 3 inches thick.

A-7 The seawall of feature A-1 wherein at least some of the poles are about 6 to about 34 inches long.

A-8 The seawall of feature A-1 wherein the poles and covering are made from the same rubber.

A-9 The seawall of feature A-8 wherein the extensions and poles are coextruded.

A-10 The seawall of feature wherein the poles are spaced apart about 0.3 to about 1 inch apart.

A-11 The seawall of feature A-1 wherein the ends of the poles are secured in place by the covering.

A-12 The seawall of feature A-1 wherein the sealant is a polysulfide sealant.

A-13 The seawall of feature A-1 wherein the rubber coating comprises ground up rubber tire with a binder.

A-14 The seawall of feature A-1 wherein at least some of the extensions are about 12 inches in height, about 10 inches in width, and about 24 inches in length.

A-15 The seawall of feature A-1 wherein the poles are about 1 to about 4 inches in diameter.

A-16 The seawall of feature A-1 comprising two layers of extensions, an upper layer and a lower layer.

A-17 The seawall of feature A-16 wherein the layers are staggered so at least some of the extensions of the upper layer are on top of two extensions of the lower layer.

B-1 A seawall comprising:
a) a base with a top;
b) a first layer of a plurality of extensions on the top of the base; a second layer of a plurality of extensions on top of the first layer, wherein at least some of the extensions of each layer comprise:
  i) a plurality of space apart rubber poles extending generally in a direction horizontal to the sea floor; and
  iii) an outer rubber covering surrounding the poles.

C-1 A plurality of extensions for placement on top of a seawall, the extensions comprising:
a) a plurality of spaced apart rubber poles; and
b) an outer rubber covering surrounding the poles.

D-1 A method of increasing the height of a seawall comprising the steps of:
a) placing a plurality of the extensions of feature C-1 on top of the seawall with the poles extending substantially parallel to the sea floor; and
b) securing the extensions to the top of the seawall.

What is claimed is:

1. A seawall comprising:
a) a base with a top;
b) a plurality of extensions on the top of the base, each extension comprising:
  i) a plurality of spaced apart rubber poles extending generally in a direction horizontal to a sea floor; and
  ii) an outer rubber covering surrounding the poles; and
c) an adhesive or sealant securing the extensions to the top of the base;
wherein there are two layers of extensions, an upper layer and a lower layer.

2. The seawall of claim 1, wherein at least some of the poles are hexagonal in horizontal cross section.

3. The seawall of claim 1, wherein at least some of the extensions are about 8 to about 16 inches in height.

4. The seawall of claim 1, wherein at least some of the extensions are about 12 to about 36 inches in length.

5. The seawall of claim 1, wherein at least some of the extensions are about 5 to about 15 inches in width.

6. The seawall of claim 1, wherein the poles and covering are made from the same rubber.

7. The seawall of claim 6, wherein the extensions and poles are coextruded.

8. The seawall of claim 1, wherein at least some of the poles are spaced apart from each other by about 0.3 inches to about 1 inch.

9. The seawall of claim 1, wherein ends of the poles are secured in place by the covering.

10. The seawall of claim 1, wherein the sealant is a polysulfide sealant.

11. The seawall of claim 1, wherein the rubber coating comprises ground up rubber tire with a binder.

12. The seawall of claim 1, wherein the layers are staggered so at least some of the extensions of the upper layer are on top of at least two extensions of the lower layer.

13. The seawall of claim 1, wherein the extensions comprise about 40% to about 70% by weight crumb rubber, about 25% to about 45% by weight high density polyethylene, and about 0% to about 15% by weight carbon black.

14. The seawall of claim 13, wherein the extensions comprise about 60% by weight crumb rubber, about 35% by weight high density polyethylene, and about 5% by weight carbon black.

15. A seawall comprising:
a) a base with a top;
b) a first layer of a plurality of extensions on the top of the base;
c) a second layer of a plurality of extensions on top of the first layer,
wherein at least some of the extensions of each layer comprise:
  i) a plurality of spaced apart rubber poles extending generally in a direction horizontal to a sea floor; and
  iii) an outer rubber covering surrounding the poles.

16. The extensions of claim 15, wherein the extensions comprise about 40% to about 70% by weight crumb rubber, about 25% to about 45% by weight high density polyethylene, and about 0% to about 15% by weight carbon black.

17. The seawall of claim 16, wherein the extensions comprise about 60% by weight crumb rubber, about 35% by weight high density polyethylene, and about 5% by weight carbon black.

18. A method of increasing the height of the seawall comprising the steps of:
a) placing a plurality of the extensions of claim 15 on top of the seawall with the poles extending substantially parallel to the sea floor; and
b) securing the extensions to the top of the seawall.

* * * * *